US012657516B2

(12) United States Patent
Kotriwala et al.

(10) Patent No.: US 12,657,516 B2
(45) Date of Patent: Jun. 16, 2026

(54) REMOVING UNDESIRABLE INFERENCES FROM A MACHINE LEARNING MODEL

(71) Applicant: ABB Schweiz AG, Baden (CH)

(72) Inventors: Arzam Kotriwala, Ladenburg (DE);
Andreas Potschka, Goslar (DE);
Benjamin Kloepper, Mannheim (DE);
Marcel Dix, Allensbach (DE)

(73) Assignee: ABB Schweiz AG, Baden (CH)

( * ) Notice: Subject to any disclaimer, the term of this patent is extended or adjusted under 35 U.S.C. 154(b) by 646 days.

(21) Appl. No.: 18/184,279

(22) Filed: Mar. 15, 2023

(65) Prior Publication Data

US 2023/0214724 A1    Jul. 6, 2023

Related U.S. Application Data

(63) Continuation of application No. PCT/EP2021/071718, filed on Aug. 4, 2021.

(30) Foreign Application Priority Data

Sep. 16, 2020    (EP) ..................................... 20196394

(51) Int. Cl.
*G06N 20/00* (2019.01)
(52) U.S. Cl.
CPC ................................... *G06N 20/00* (2019.01)
(58) Field of Classification Search
CPC ......... G06N 20/00; G06N 5/025; G06N 5/045
See application file for complete search history.

(56) References Cited

FOREIGN PATENT DOCUMENTS

EP    3599617 A1    1/2020

OTHER PUBLICATIONS

Anders et al. (hereinafter Anders) "XAI for Analyzing and Unlearning Spurious Correlations in ImageNet" Published Jul. 13, 2020 (Year: 2020).*
Patrick et al. (hereinafter Patrick) "Making deep neural networks right for the right scientific reasons by interacting with their explanations" Published Jun. 19, 2020. (Year: 2020).*
Cao et al., "Efficient Repair of Polluted Machine Learning Systems via Causal Unlearning," *Proceedings of the 2018 on Asia Conference on Computer and Communications Security (ASIACCS)*, 735-747 (Jun. 4-8, 2018).
Shintre et al., "Making Machine Learning Forget," *Symantec*, 16 pp. (2017).
Anders et al., "XAI for Analyzing and Unlearning Spurious Correlations in ImageNet," *Proceedings of the 37th International Conference on Machine Learning (ICML)*, 17 pp. (Jul. 13, 2020).
(Continued)

*Primary Examiner* — Pei Yong Weng
(74) *Attorney, Agent, or Firm* — Fitch Even Tabin & Flannery LLP

(57) ABSTRACT

A method and system for removing undesirable inferences from a machine learning model include a search component configured to receive a rejected explanation of model output provided by the machine learning model, identify data samples to unlearn by selecting training samples from training data that were used to train the machine learning model, the selected training samples being associated with explanations that are similar to the rejected explanation according to a calculated similarity measure, and pass the data samples to unlearn to a machine unlearning unit.

14 Claims, 5 Drawing Sheets

(56) References Cited

OTHER PUBLICATIONS

Anonymous, "Machine Unlearning—techniques—Data Science, Analytics and Big Data discussions," *Analytics Vidhya,* 3 pp. (Jul. 2016).

Bourtoule et al., "Machine Unlearning," *arXiv—Cornell University Library,* 19 pp. (Jul. 17, 2020).

Cao et al., "Towards making systems forget with machine unlearning," *2015 IEEE Symposium on Security and Privacy,* IEEE, 464-480 (2015).

Ribeiro et al., "Anchors: High-precision model-agnostic explanations," *Thirty-Second AAAI Conference on Artificial Intelligence,* 1527-1535 (2018).

Ribeiro et al., "'Why Should I Trust You?': Explaining the Predictions of Any Classifier," *Proceedings of the 22nd ACM SIGKDD International Conference on Knowledge Discovery and Data Mining,* 10 pp. (Aug. 13, 2016).

Schramowski et al., "Making deep neural networks right for the right scientific reasons by interacting with their explanations," *Preprint arXiv—Cornell University Library,* 18 pp. (Jun. 19, 2020).

Štrumbelj et al., "Explaining prediction models and individual predictions with feature contributions," *Knowledge and Information Systems (KAIS),* 41(3): 1 p. (Dec. 2014).

European Patent Office, Extended European Search Report in European Patent Application No. 20196394.9, 12 pp. (Mar. 19, 2021).

European Patent Office, International Search Report in International Patent Application No. PCT/EP2021/071718, 3 pp. (Nov. 26, 2021).

European Patent Office, Written Opinion in International Patent Application No. PCT/EP2021/071718, 10 pp. (Nov. 26, 2021).

* cited by examiner

REMOVING UNDESIRABLE INFERENCES FROM A MACHINE LEARNING MODEL

CROSS-REFERENCE TO RELATED APPLICATIONS

This patent application claims priority to International Patent Application No. PCT/EP2021/071718, filed on Aug. 4, 2021, and to European Patent Application No. 20196394.9, filed on Sep. 16, 2020, each of which is incorporated herein in its entirety by reference.

FIELD OF THE DISCLOSURE

The present disclosure relates to a system and method for removing undesirable inferences from a machine learning model.

BACKGROUND OF THE INVENTION

The lack of insight provided concerning the 'reasoning' of machine learning (ML) models does not instill trust in end-users and limits the acceptance of ML in industry, even when the end-users are domain experts. Systems have been proposed to explain as well as contextualize ML outputs in technical systems in industrial applications, which fosters acceptance of the ML decision support. However, a domain expert may still lose trust in the ML model if either or both of the model output and its explanation are perceived to be incorrect. ML models are typically trained using historical data and it is not uncommon that, with the passage of time, rules previously inferred may no longer be valid. Rules learned by the ML model at any time may contradict the expertise of the domain expert. Machine Unlearning (MuL) has been proposed as a way of "unlearning" or removing undesirable inferences, as described for example in L. BOURTOULE ET AL. Machine Unlearning. arXiv: 1912.03817, 2020.

BRIEF SUMMARY OF THE INVENTION

There is a need to identify the source of undesirable inferences which are to be removed from an ML model. According to a first aspect, there is provided a system for removing undesirable inferences from a machine learning model. The system comprises a search component configured to: receive a rejected explanation of model output provided by the machine learning model; identify data samples to unlearn by selecting training samples from training data that were used to train the machine learning model, the selected training samples being associated with explanations that are similar to the rejected explanation (e.g. according to a calculated similarity measure, with the calculated similarity measure satisfying (e.g., exceeding) a predetermined threshold); and pass the data samples to unlearn to a machine unlearning unit.

In this way, a machine learning pipeline may be provided that includes not only an explainer path (to explain the model output) but also a feedback path (to correct or improve the model), providing domain experts with the capability to tune ML models by leveraging model output explanations. The system may be applied in an industrial setting to improve quality of ML model outputs. The system promises high potential in the area of transfer learning, where a trained machine learning model is used as a starting point for training on a new industrial process, because it offers the possibility to unlearn predictions and explanations that do not apply to the new process.

In one implementation, the search component may be configured to identify the data samples to unlearn by: obtaining a training explanation associated with a respective candidate training sample selected from the training data; calculating an explanation similarity measure between the rejected explanation and the training explanation; comparing the calculated explanation similarity measure to an explanation similarity threshold; and selecting the training sample for inclusion in the data samples to unlearn in response to the calculated explanation similarity measure satisfying the explanation similarity threshold. The search component may be further configured to calculate a sample similarity measure between the rejected sample and the training sample, to compare the calculated sample similarity measure to a sample similarity threshold, and to identify as data samples to unlearn only those selected training samples whose calculated sample similarity measures also satisfy the sample similarity threshold. The search component may be further configured to repeat the obtaining, calculating, comparing, and selecting for one or more further training samples in the training data.

As used in the present disclosure, "similarity measure" is used to mean any suitable metric for representing similarity. In some implementations, the search component may be configured to calculate the explanation similarity measure as either (i) a distance metric between the rejected explanation and the training explanation, the distance metric comprising one or more of a Euclidian distance, a City-Block distance, a Mahalanobis distance, a Huber distance, or an elastic distance measure such as Dynamic Time Warping or a Levenshtein distance, or (ii) a Jaccard similarity coefficient. The sample similarity measure described herein may be calculated in the same way.

The explanations may be rule-based, in which case the search component may be configured to identify the explanations that are associated with training samples as being similar to the rejected explanation in response to one or more of (i) premises, (ii) structure, and (iii) decision values of the rule-based explanations being the same or similar (e.g. within a predetermined similarity threshold).

In the case that the explanations comprise prototypes, the search component may be configured to identify the explanations that are associated with training samples as being similar to the rejected explanation in response to the same prototype being produced.

The machine unlearning unit may be configured to remove undesirable inferences from the machine learning model by assigning, to the data samples to unlearn, weightings for a training loss function before retraining the machine learning model using an updated set of the training data. The weightings may be set at 0 to effect a complete removal of the unwanted data samples or any weighting between 0 and 1 may be used for advantageous partial removal, if this is desired.

The weightings assigned to the data samples to unlearn may be based on the similarity measures calculated for those data samples.

The weightings may be assigned to some but not all of a plurality of signals in the data samples to unlearn, allowing useful signals in the data samples to unlearn to be retained for further training of the model.

The machine unlearning unit may be configured to incrementally change the weightings based on the Implicit Function Theorem applied to optimality conditions of a machine model training loss minimization problem, in order to avoid complete retraining in favor of incremental training.

To readily implement complete removal of the undesirable inferences, the machine unlearning unit may be configured to remove undesirable inferences from the machine learning model by retraining the machine learning model using an updated set of the training data from which the data samples to unlearn have been removed.

Instead of removing the unwanted samples completely or reducing their weighting, the machine unlearning unit may be configured to alter the data samples to unlearn by finding perturbations to the data samples that result in an explanation derived from the perturbed data samples matching a non-rejected explanation. This provides an expert with the possibility to generate artificial training data from existing training data in order to change the model's decision boundary in such a way that the yielded explanations comply better with the expert's domain knowledge.

According to a second aspect, there is provided a method for removing undesirable inferences from a machine learning model. The method comprises: receiving a rejected explanation of model output provided by the machine learning model; identifying data samples to unlearn by selecting training samples from training data that were used to train the machine learning model, the selected training samples being associated with explanations that are similar to the rejected explanation according to a calculated similarity measure; and passing the data samples to unlearn to a machine unlearning unit.

According to a third aspect, there is provided a computer program product comprising instructions which, when executed by a computer, cause the computer to perform the method of the second aspect.

According to a fourth aspect, there is provided a non-transitory computer storage medium having stored thereon the computer program product of the third aspect.

Any optional features or sub-aspects of any aspect apply as appropriate to any other aspect.

The above aspects and examples will become apparent from and be elucidated with reference to the following detailed description.

BRIEF DESCRIPTION OF THE SEVERAL VIEWS OF THE DRAWING(S)

DETAILED DESCRIPTION OF THE INVENTION

Figure 1:
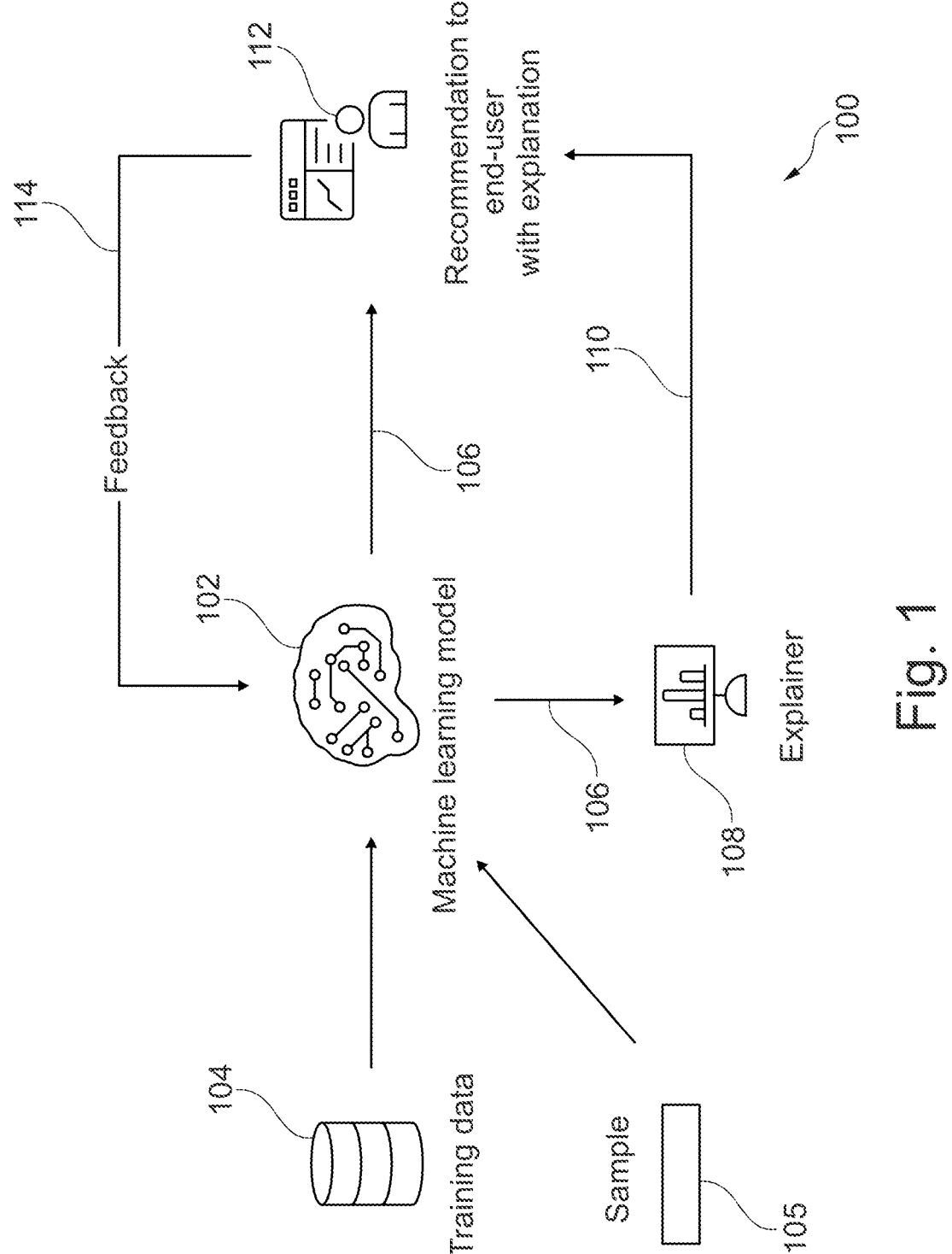
FIG. 1 shows a machine learning system including not only an explainer path but also a feedback path, in accordance with the disclosure.

FIG. 1 shows a high-level view of a machine learning system 100 including not only an explainer path but also a feedback path. The system 100 may be applicable wherever an ML model is used in an industrial application and independently of the type of ML model. The ML model 102 is trained on the basis of training data 104 to provide ML model output 106 to an end-user 112 when a sample 105 is input to the model 102. The model output 106 may comprise a recommendation to the end-user 112 to take a predetermined action. An explainer 108 also receives the model output 106 and provides to the end-user 112 an explanation 110 of the model output 106. The path model-explainer-end-user constitutes the explainer path. The explanation 110 may be produced in any known way. One example of providing explanation of ML model output is described for example in related European patent application no. 20 196 232.1. According to the present disclosure, the path end-user-model constitutes the feedback path, whereby the end-user 112 is able to provide feedback 114 to the ML model 102.

Figure 2:
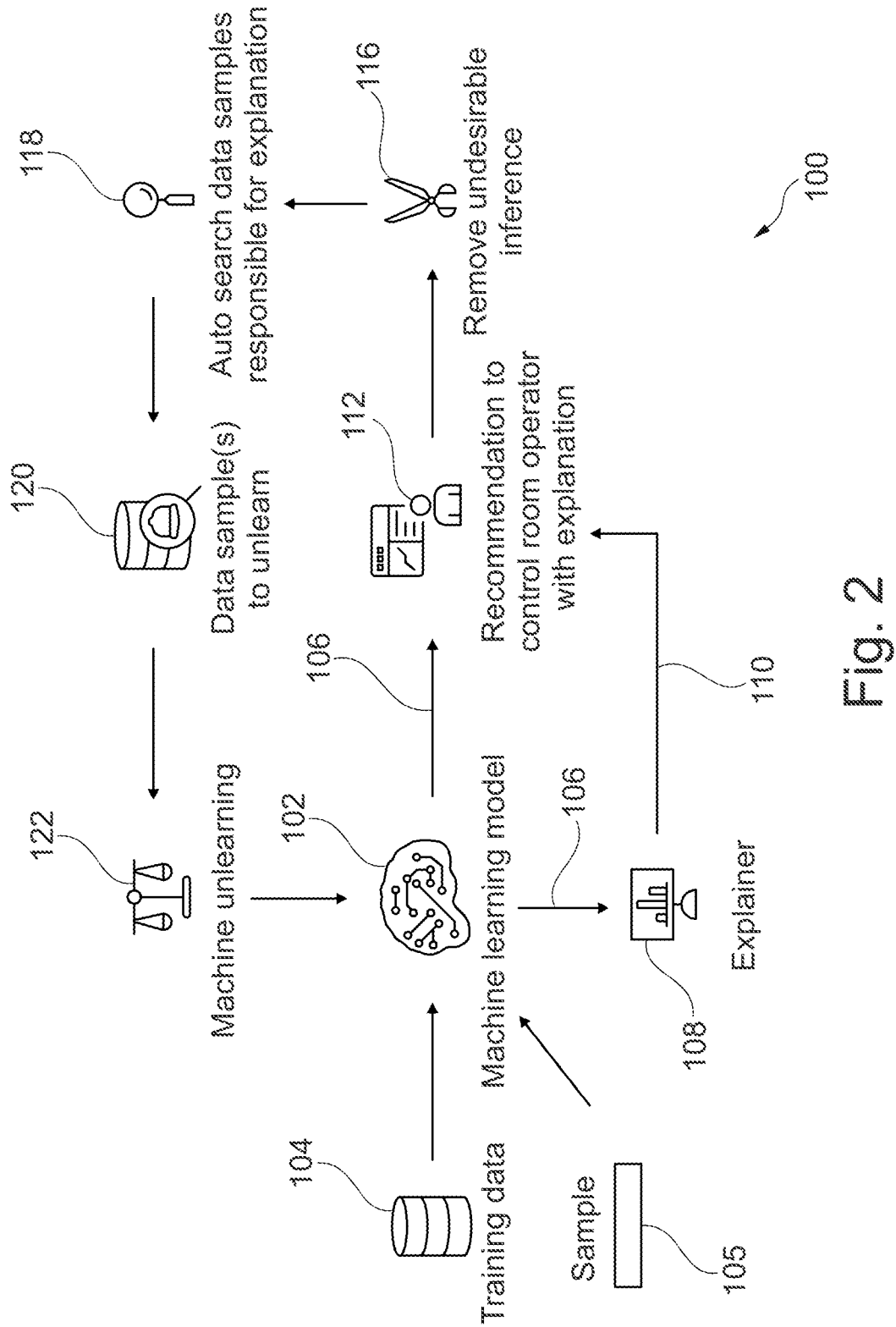
FIG. 2 shows the feedback path in the system of FIG. 1 in more detail.

FIG. 2 shows the feedback path in the ML system 100 in more detail. In this example, the end-user 112 is a control room operator as the domain expert for whom the ML model 102 was created. The operator 112, using his own expertise, can evaluate the explanation 110 provided to him by the explainer 108 and consequently provide the feedback 114. The operator 112 may deem the model output 106 and/or the explanation 110 to be inaccurate and thus use the feedback path to have this undesirable inference removed from the system 100. The operator 112 may for example choose whether the MuL unit 122 is to remove this undesirable inference from the system 100 completely or to consider it less important (in the latter case, the affected training data 104 may not be removed but rather assigned less weight in the ML model 102), as described further below.

An example of an inference which the operator may like to remove could comprise for example an erroneous inference which the ML model 102 made based on training data 104 gathered as a result of apprentice operator actions. Another example concerns changes in the plant equipment or production process which have been implemented over a period of time, so that older rules inferred by the ML model 102 no longer reflect the new reality. Yet another example involves rules inferred by the ML model 102 which are false from a domain perspective, such as rules which have been falsely learned on the basis of training data 104 provided when the plant equipment was in maintenance mode.

Following the decision to remove the undesirable inference, the operator 112 initiates a removal process 116 to remove the undesirable inference, designating the explanation 110 as a rejected explanation.

Since the operator 112 sees only the model output 106 and explanation 110 when calling for the undesirable inference to be removed, a search component 118 is provided to consolidate all raw data points that contributed to the undesirable inference as one or more data samples to unlearn 120.

Figure 3:
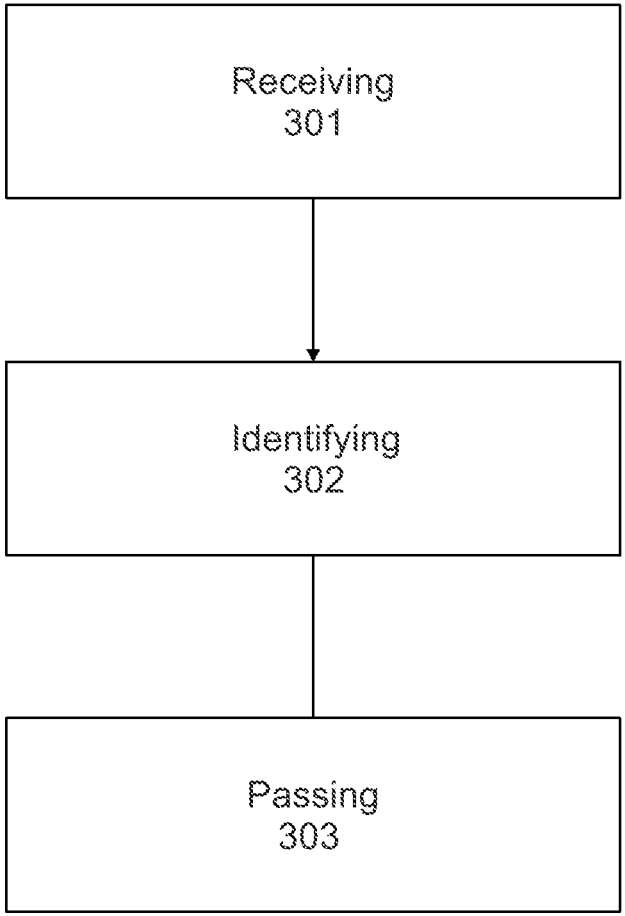
FIGS. 3 and 4 illustrate methods of identifying samples to be unlearned, in accordance with the disclosure.
Figure 4:
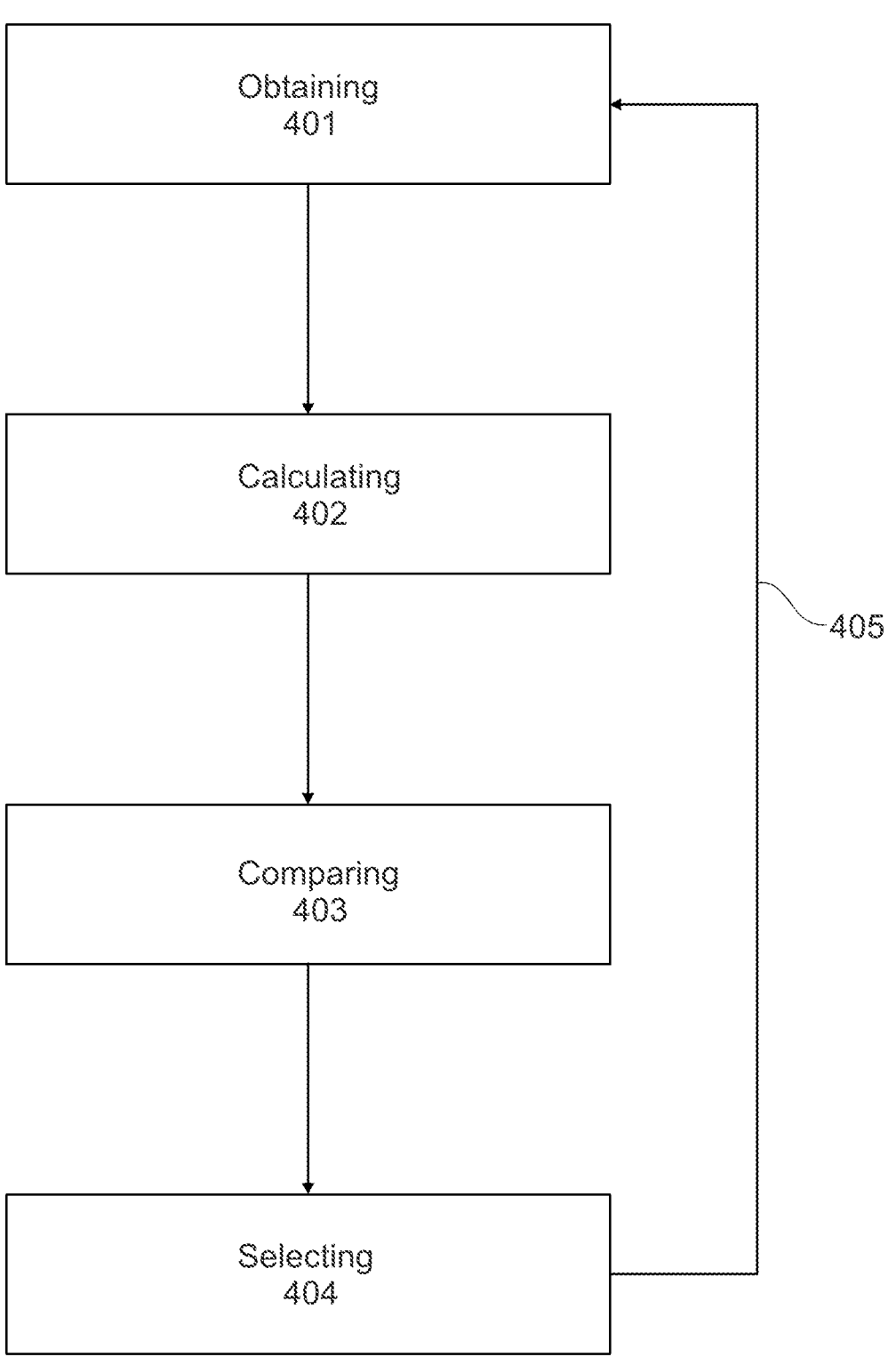

Referring to FIGS. 3 and 4, with FIG. 4 illustrating step 302 of FIG. 3 in more detail, the search component 118 is configured automatically to identify the data samples to unlearn 120 by selecting training samples from the training data 104 associated with explanations that are similar to the rejected explanation.

For example, the search component 118 is configured to:
1. Receive (301) the rejected explanation identified by the operator 112 when initiating the removal process 116, the rejected explanation being derived from or associated with at least one rejected sample;
2. Identify (302) the data samples to unlearn 120 by selecting from the training data 104 one or more training samples that are associated with explanations similar to the rejected explanation (and which therefore contributed to the undesirable inference), for example by:
   i. Obtaining (401) a training explanation associated with a respective candidate training sample selected from the training data 104, for example by computing for the training sample an explanation (e.g. by inputting the training sample to the ML model 102 to generate model output and inputting that model output to the explainer 108), and/or by retrieving a precomputed explanation associated with the training sample, where the precomputed explanation was computed upfront for one or more versions of the ML model 102 and stored for later retrieval;

ii. Calculating (402) an explanation similarity measure between the rejected explanation and the training explanation, and optionally also calculating a sample similarity measure between the rejected sample and the training sample;

iii. Comparing (403) the calculated explanation similarity measure to an explanation similarity threshold and optionally also comparing the calculated sample similarity measure to a sample similarity threshold;

iv. Selecting (404) the training sample for inclusion in the data samples to unlearn 120 in response to the calculated explanation similarity measure satisfying the explanation similarity threshold, the selected data samples to unlearn 120 being optionally further limited to include only those training samples whose calculated sample similarity measures also satisfy the sample similarity threshold; and v. Optionally repeating (405) steps 401-404 for one or more further training samples, for example by traversing all training samples in the training data 104, or by traversing select representative samples (e.g. cluster centroids derived by grouping all training samples into clusters using an unsupervised clustering algorithm); and 3. Pass (303) the data samples to unlearn 120 to the MuL unit 122.

In the case that the sample 105 is used also as training data for further development of the ML model 102, the sample 105 may be incorporated in the data samples to unlearn 120.

The process of selecting training samples to unlearn as shown in FIGS. 3 and 4 is thus based on similarity measures. Respective similarity measures may be used for both the explanations and the samples. Generally speaking, if a training sample similar to the rejected sample with the rejected explanation yields an explanation which is similar to the rejected explanation, it may be a good candidate for unlearning. So, two similarity measures may be defined: the sample similarity measure and the explanation similarity measure. In the context of the present disclosure, the term "similarity measure" may be taken to include also distance measures as a measure of the difference between two samples or explanations.

Concerning the sample similarity measure, a sample in machine learning can be described as a vector or matrix s and the dimension $s_i$ ($x_{i,j}$ in case of a matrix) often share the same numerical data type (e.g. $U=\mathbb{R}^N$ or $U=\mathbb{N}^N$) and all data samples share the same dimension N. Examples comprise a series of a temperature measurements sampled at equidistant times (say, for instance once per minute), or the pixel values of an image. Further examples comprising vectors of different length and non-homogenous data types are described below. The similarity of two samples $s^1$ and $s^2$ can for instance be measured by the Euclidian distance:

$$d(s^1, s^2) = \sqrt{\sum_{i=1}^{n}(s_i^1 - s_i^2)^2}.$$

If $s^1$ and $s^2$ are equal, then $d(s^1,s^2)$ will be zero. The less $s^1$ and $s^2$ are alike, the larger $d(s^1,s^2)$ will become. The Euclidian distance can be replaced or supplemented with other distance measures such as the City-Block distance, Mahalanobis distance, or distances that are more robust to outliers like the Huber distance. Additionally or alternatively, similarity measures like the Jaccard coefficient could be used. If the dimension of the vector varies, elastic distance measures like Dynamic Time Warping (DTW) or the Levenshtein distance can be used. When applied to matrices, these distance measures can be applied row- or column-wise.

Regarding the explanation similarity measure, the question of how to measure the similarity of two explanations 110 may depend on the structure of the explanation. Using the same notation, the similarity (e.g. distance) measure between two explanations $e^1$ and $e^2$ may be expressed as $d(e^1,e^2)$.

The explanations 110 may comprise feature explanations. For example, feature explanation methods such as LIME (M. T. RIBEIRO ET AL. "Why Should I Trust You?" Explaining the Predictions of Any Classifier) or SHAP (Shapley sampling values as described in E. ŠTRUMBELJ ET AL. Explaining prediction models and individual predictions with feature contributions. Knowledge and Information Systems 41.3, 2014, pages 647-665) may be used to assign to each feature $x_{i,j}$ an importance weight $w_{i,j}$. In this case, the similarity of features can be measured in the same way as the similarity of samples, as described above.

Another way of providing the explanations 100 is by employing rules, for instance generated by the ANCHORs method (M. T. RIBEIRO ET AL. Anchors: High-precision model-agnostic explanations. Thirty-Second AAAI Conference on Artificial Intelligence, 2018) or by a decision tree surrogate model. One example of a rule-based explanation 110 could be:

Rule 1: IF temperature t>100° AND flow f<1 m³/s THEN product quality is good. Two rule-based explanations may be considered to be similar if they have the same premises in the same structure (considered as features and comparison operator) and similar decision values. For instance, the following rule can be considered similar to Rule 1:

Rule 2: IF temperature t>105° AND flow f<0.8 m³/s THEN product quality is good.

The decision regarding similarity can be extended by allowing additional or missing premises. For instance, the following rule might be considered similar to Rule 1 and Rule 2:

Rule 3 IF temperature t>105° THEN product quality is good.

Methods like ANCHORs try to find rules that apply to a large subset of the training data 104 and thus will produce a small number of rules so that the above-outlined rule-based process will be sufficient in most practical cases.

Another way of providing the explanations 110 is by prototype. In this case, the explainer 108 presents a prototype that represents how machine learning represents the sample internally and optionally how similar the internal representation of the sample is to the prototype. If the explainer 108 only presents the prototype, two explanations 110 are similar or identical if the same prototype is produced. If the explainer 108 also provides a measure of similarity to the prototype, this similarity to the prototype can be used. If the similarity or distance to all prototypes is delivered, a measure like the Euclidian distance can be used.

As described above in relation to FIGS. 3 and 4, the training explanations for the training samples may be generated on demand or generated upfront. With the above-described methods of measuring the similarity of a training sample $s^t$ and the rejected sample $s^r$ and the similarity of the corresponding training and rejected explanations $e^t$ and $e^r$, one way of selecting training samples for inclusion in the data samples to unlearn 120 (as described above with reference to steps 403 and 404) is by applying the two thresholds using the rule:

$$\text{IF } d(s^r,s^t)) < t_s \text{ and } d(e^r,e^t) < t_e \text{ then unlearn } s^t,$$

where $t_s$ is the sample similarity threshold and $t_e$ is the explanation similarity threshold. As described below, the values of $d(s^r,s^t)$ and $d(e^r, e^t)$ can be also used as weights (or to calculate weights) in the unlearning process.

Referring again to FIG. 2, the consolidated data samples to unlearn 120 are passed on to an MuL unit 122 employing an MuL algorithm (such as that described in BOURTOULE ET AL. Machine Unlearning) to be unlearnt. The MuL unit 122 may employ any one or more of a number techniques for unlearning samples, as will now be described.

One readily implementable form of unlearning the unwanted samples 120 comprises the MuL unit 122 retraining the ML model 102 using an updated set of training data 104 from which the unwanted samples 120 have been removed.

In order to increase the flexibility of the forgetting mechanism, and as an alternative to the complete removal of the unwanted samples 120, the MuL unit 122 may apply remembrance factors to the unwanted samples 120, wherein each remembrance factor multiplies the term of its corresponding unwanted sample 120 in the training loss function. Choosing a remembrance factor of 0 is equivalent to removing the unwanted sample 120 from the training data 104, while choosing a remembrance factor of 1 is equivalent to retaining the sample as before. Extra flexibility can be gained by choosing remembrance factors between 0 and 1, for instance based on the similarity measures, which means that the unwanted samples 120 may also be half-forgotten, for example.

For the mapping of a similarity measure to the remembrance factor an inverted sigmoidal function with upfront specified scale and slope parameters or a thresholding step function can be employed.

Additional flexibility can be gained by employing even more fine-grained remembrance factors that can vary for different components of the labels of the unwanted samples 120. These remembrance factors can be used partially to mask out the unwanted samples 120. In the exemplary case of an industrial plant in which the position of a temperature sensor was modified, instead of discarding the unwanted samples 120 in their entirety, fine-grained remembrance factors enable masking out only the now-invalid temperature signal and save all the remaining information of the unwanted samples 120 for training. This can be achieved by setting the remembrance factors corresponding to the temperature signal data to 0 while keeping all other signals' remembrance factors at 1.

Besides the increased flexibility that remembrance factors deliver, they can also be leveraged by the MuL unit 122 to reduce the computational ML training effort by using mathematical sensitivity analysis of the optimal ML weights (where "weight" refers here to the degrees of freedom in the ML model 102, not the feature weights of an explanation 110) with respect to the continuous remembrance factors, based for example on the Implicit Function Theorem applied to the optimality conditions of the ML training loss minimization problem. The MuL unit 122 may thus change the optimal weights in correspondence to changes in the remembrance factors, in order to avoid complete retraining in favor of incremental training. The application of the Implicit Function Theorem yields that the inverse of the so-called Hessian matrix of the training objective function yields the correct scaling of increments in the remembrance factors to the optimal ML weights increments. Hence, approximately optimal ML weight increments can be computed by iterative linear algebra methods, such as the conjugate gradients method, which only require Hessian matrix-vector products that modern ML frameworks can compute efficiently for mini-batch approximation of the Hessian.

Additionally, or alternatively, an approach using learning and unlearning using summations may be used by the MuL unit 122, as presented in Y. CAO ET AL. Towards Making Systems Forget with Machine Unlearning. The approach comprises transforming learning algorithms into a summation form. To forget an unwanted sample 120, the approach only needs to update a small number of summations, which is asymptotically faster than retraining from scratch. This approach is general in that the summation form is from statistical query learning in which many machine learning algorithms can be implemented.

Figure 5:
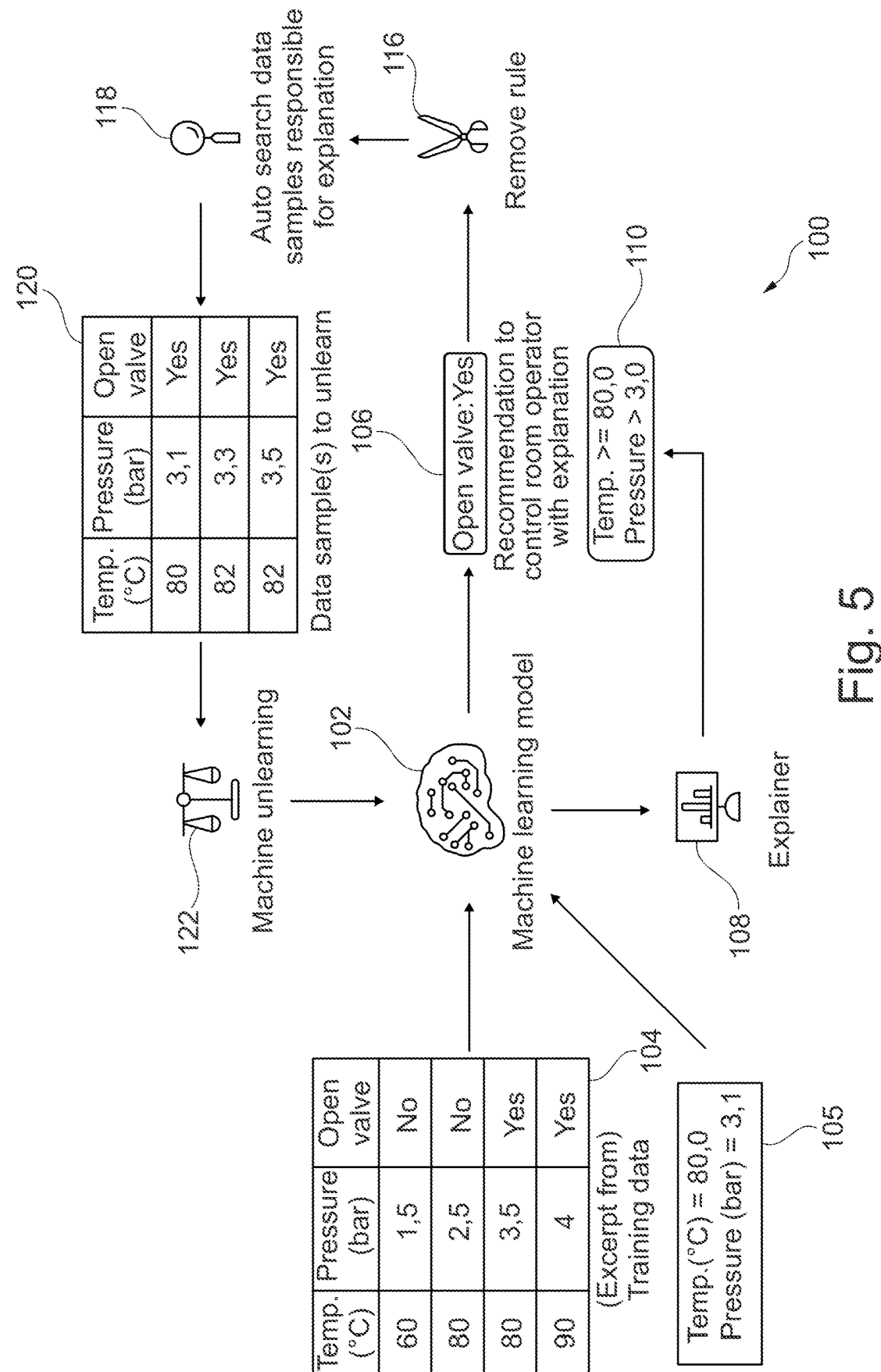
FIG. 5 illustrates a use case of the system of FIG. 1.

FIG. 5 illustrates how the ML system 100 as depicted in FIG. 2 may be applied in an industrial setting. The training data 104 comprises two features, temperature and pressure, which determine whether a valve in a monitored system (e.g., industrial plant equipment) should be opened or remain closed (for the sake of simplicity, only an excerpt of the training data 104 is shown in FIG. 5). Considering one example in which the monitored system provides as the sample 105 a temperature of 80.0° C. and a pressure of 3.1 bar, the ML model 102 provides as model output 106 a recommendation to open the valve. The corresponding inference presented to the control room operator 112 as the explanation 110 is the rule "Temp.>=80.0 and Pressure>3.0". Based on his expertise, the operator 112 may believe this explanation 110 to be incorrect (or no longer valid or applicable) and thus may want this undesirable inference to be removed from the system 100 completely. The operator 112 thus initiates the removal process 116, whereupon the search component 118 consequently retrieves all raw data points that contributed to this undesirable inference, in the manner described above. FIG. 5 shows that 3 data samples to unlearn 120 were selected from the underlying training data 104 that fulfilled the criteria provided by the explanation 110. These data samples 120 are passed on to the MuL unit 122 to be unlearnt.

In addition to unlearning the samples 120 which produced the rejected explanation, the MuL unit 122 may alter the samples 120 to produce an explanation that complies with the opinion of the end-user 112. To do so, the end-user 112 is given the option to alter the explanation 110 or annotate the associated sample 105 to capture domain insight. The system 100 then perturbates the data samples in such a way that the output of the explainer 108 matches the altered explanation. Sample perturbation (such as that described in M. T. RIBEIRO ET AL. "Why Should I Trust You?" Explaining the Predictions of Any Classifier) combined with an optimization or meta-learning process (such as that described in European patent application no. 20 196 232.1) can be used to alter the samples 120 resulting in the rejected explanation. If the process succeeds in producing useful new data samples, the original samples 120 can be preserved: The new data sample will impact the decision border of the ML model 102 in such a way that the explanation 110 provided by the explainer 108 also changes.

The end-user 112 as domain expert may be replaced by a system (e.g., an expert system) that encapsulates domain knowledge and provides the feedback 114 instead of the human domain expert. The expert system can be another ML model. Thus, the decision on whether to remove the unwanted samples 120 completely or to remove their weighting (as described above) may be taken automatically by the expert system based on predetermined rules, based on a threshold of the proximity of the explanation to an acceptable explanation, or based on additional information concerning samples in the affected training data 104. The predetermined rules can be based on, e.g., data/actions/knowledge of human domain experts which has/have already been modeled.

From the above, it is clear that one or more computer programs comprising machine-readable instructions can be provided which, when executed on one or more computers, cause the one or more computers to perform the described and claimed methods. Also, from the above it is clear that a non-transitory computer storage medium, and/or a download product, can have stored thereon the one or more computer programs. One or more computers can then operate with the one or more computer programs. One or more computers can then comprise the non-transitory computer storage medium and/or the download product.

While the invention has been illustrated and described in detail in the drawing and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for removing undesirable inferences from a machine learning model, the system comprising:

a machine learning model stored on a computer;

a machine unlearning unit executed by the computer;

a search component, the search component being executed by the computer and configured to:

receive a rejected explanation of model output provided by the machine learning model, wherein the rejected explanation is an explanation of a recommendation produced by the machine learning model;

identify data samples to unlearn by selecting training samples from training data that were used to train the machine learning model, the selected training samples being associated with training explanations that are similar to the rejected explanation according to a calculated similarity measure; and pass the data samples to unlearn to the machine unlearning unit;

wherein either:

the explanations are rule-based, and wherein the search component is configured to identify the training explanations that are associated with training samples as being similar to the rejected explanation in response to one or more of i) premises, ii) structure, and iii) decision values of the rule-based explanations being the same or similar; or the explanations comprises feature explanations, wherein each feature is assigned an importance weight, and wherein the search component is configured to calculate the explanation similarity measure as either i) a distance metric between the rejected explanation and the training explanations, the distance metric comprising one or more of a Euclidean distance, a City-Block distance, a Mahalanobis distance, a Huber distance, an elastic distance measure, or a Jaccard similarity coefficient;

wherein the machine unlearning unit is configured to remove undesirable inferences from the machine learning model by either:

i) assigning, to the data samples to unlearn, weightings for a training loss function before retraining the machine learning model using an updated set of the training data; or ii) retraining the machine learning model using an updated set of the training data from which the data samples to unlearn have been removed; or iii) altering the data samples to unlearn by finding perturbations to the data samples that result in an explanation derived from the perturbed data samples matching a non-rejected explanation;

wherein the machine learning model is configured to receive, as the training data, one or more signals from sensors at monitored and operating industrial plant equipment and to produce recommendations to an end user to take an action, the action involving controlling the operation of the industrial equipment.

2. The system of claim 1, wherein the search component is configured to identify the data samples to unlearn by:

obtaining a training explanation associated with a respective candidate training sample selected from the training data;

calculating an explanation similarity measure between the rejected explanation and the training explanation;

comparing the calculated explanation similarity measure to an explanation similarity threshold; and selecting the training sample for inclusion in the data samples to unlearn in response to the calculated explanation similarity measure satisfying the explanation similarity threshold.

3. The system of claim 2, wherein the search component is further configured to calculate a sample similarity measure between the rejected sample and the training sample, to compare the calculated sample similarity measure to a sample similarity threshold, and to identify as data samples to unlearn only those selected training samples whose calculated sample similarity measures also satisfy the sample similarity threshold.

4. The system of claim 2, wherein the search component is further configured to repeat the obtaining, calculating, comparing, and selecting for one or more further training samples in the training data.

5. The system of claim 1, wherein the weightings assigned to the data samples to unlearn are based on the similarity measures calculated for those data samples.

6. The system of claim 1, wherein the weightings are assigned to some but not all of a plurality of signals in the data samples to unlearn.

7. The system of claim 1, wherein the machine unlearning unit is configured incrementally to change the weightings based on the Implicit Function Theorem applied to optimality conditions of a machine model training loss minimization problem.

8. A method for removing undesirable inferences from a machine learning model, the method comprising:

receiving a rejected explanation of model output provided by the machine learning model, wherein the rejected explanation is an explanation of a recommendation produced by the machine learning model;

identifying data samples to unlearn by selecting training samples from training data that were used to train the machine learning model, the selected training samples being associated with explanations that are similar to the rejected explanation according to a calculated similarity measure; and passing the data samples to unlearn to a machine unlearning unit;

by a machine learning unit, removing undesirable inferences from the machine learning model by either:

i) assigning, to the data samples to unlearn, weightings for a training loss function before retraining the machine learning model using an updated set of the training data;

ii) retaining the machine learning model using an updated set of the training data from which the data samples to unlearn have been removed, or iii) altering the data samples to unlearn by finding perturbations to the data samples that result in an explanation derived from the perturbed data samples matching a non-rejected explanation;

wherein the machine learning model is configured to receive, as the training data, one or more signals from sensors at monitored and operating industrial plant equipment and to produce recommendations to an end user to take an action, the action involving controlling the operation of the industrial equipment.

9. The method of claim 8, wherein the method is carried out by a search component, the method further comprising:

obtaining a training explanation associated with a respective candidate training sample selected from the training data;

calculating an explanation similarity measure between the rejected explanation and the training explanation;

comparing the calculated explanation similarity measure to an explanation similarity threshold; and selecting the training sample for inclusion in the data samples to unlearn in response to the calculated explanation similarity measure satisfying the explanation similarity threshold.

10. The method of claim 9, wherein the search component is further configured to calculate a sample similarity measure between the rejected sample and the training sample, to compare the calculated sample similarity measure to a sample similarity threshold, and to identify as data samples to unlearn only those selected training samples whose calculated sample similarity measures also satisfy the sample similarity threshold.

11. The method of claim 9, wherein the search component is further configured to repeat the obtaining, calculating, comparing, and selecting for one or more further training samples in the training data.

12. The method of claim 9, wherein the search component is configured to calculate the explanation similarity measure as either (i) a distance metric between the rejected explanation and the training explanation, the distance metric comprising one or more of a Euclidian distance, a City-Block distance, a Mahalanobis distance, a Huber distance, or an elastic distance measure such as Dynamic Time Warping or a Levenshtein distance, or (ii) a Jaccard similarity coefficient.

13. The method of claim 8, wherein the explanations are rule-based, and wherein the search component is configured to identify the explanations that are associated with training samples as being similar to the rejected explanation in response to one or more of (i) premises, (ii) structure, and (iii) decision values of the rule-based explanations being the same or similar.

14. The method of claim 8, wherein the explanations comprise prototypes, and wherein the search component is configured to identify the explanations that are associated with training samples as being similar to the rejected explanation in response to the same prototype being produced.

* * * * *